April 18, 1933.  C. H. FOWLER  1,903,991

RIDGING IMPLEMENT ON TILLING MACHINES

Original Filed March 25, 1930   2 Sheets-Sheet 1

Inventor.
Charles Henry Fowler.
Attorney.

April 18, 1933.    C. H. FOWLER    1,903,991
RIDGING IMPLEMENT ON TILLING MACHINES
Original Filed March 25, 1930    2 Sheets-Sheet 2

Inventor.
Charles Henry Fowler.
Attorney.

Patented Apr. 18, 1933

1,903,991

UNITED STATES PATENT OFFICE

CHARLES HENRY FOWLER, OF LEEDS, ENGLAND

RIDGING IMPLEMENT ON TILLING MACHINES

Application filed March 25, 1930, Serial No. 438,794, and in Great Britain January 28, 1930. Renewed August 11, 1932.

This invention relates to tilling machines of the type in which a rotating digger or tilling instrument having its axis substantially approximating to the vertical is drawn through the soil by a suitable tractor.

In such machines the rotating tillers, usually two in number, have been followed by plough-like trenching implements acting as spreaders or ridgers, usually two in number, side by side, at a distance apart.

The purpose of the present invention is to provide for the adjustment of these spreaders or ridgers collectively towards the right or left as regards the medial line of movement of the tilling machine, by mechanism operatable from near the driver's seat while the tractor is moving or turning.

The invention further comprises an improved structure for attachment of the spreaders or ridgers to the tractor frame, permitting also of adjustment of their distance apart from one another.

The invention comprises features of construction intended for the fulfilment of the above and other purposes as hereinafter described and more particularly pointed out in the claims.

Reference being made to the annexed drawings in which:

Fig. 3 is a broken plan view and Fig. 4 is a rear elevation of part of the carriage to which the ridgers are attached.

Figure 1:
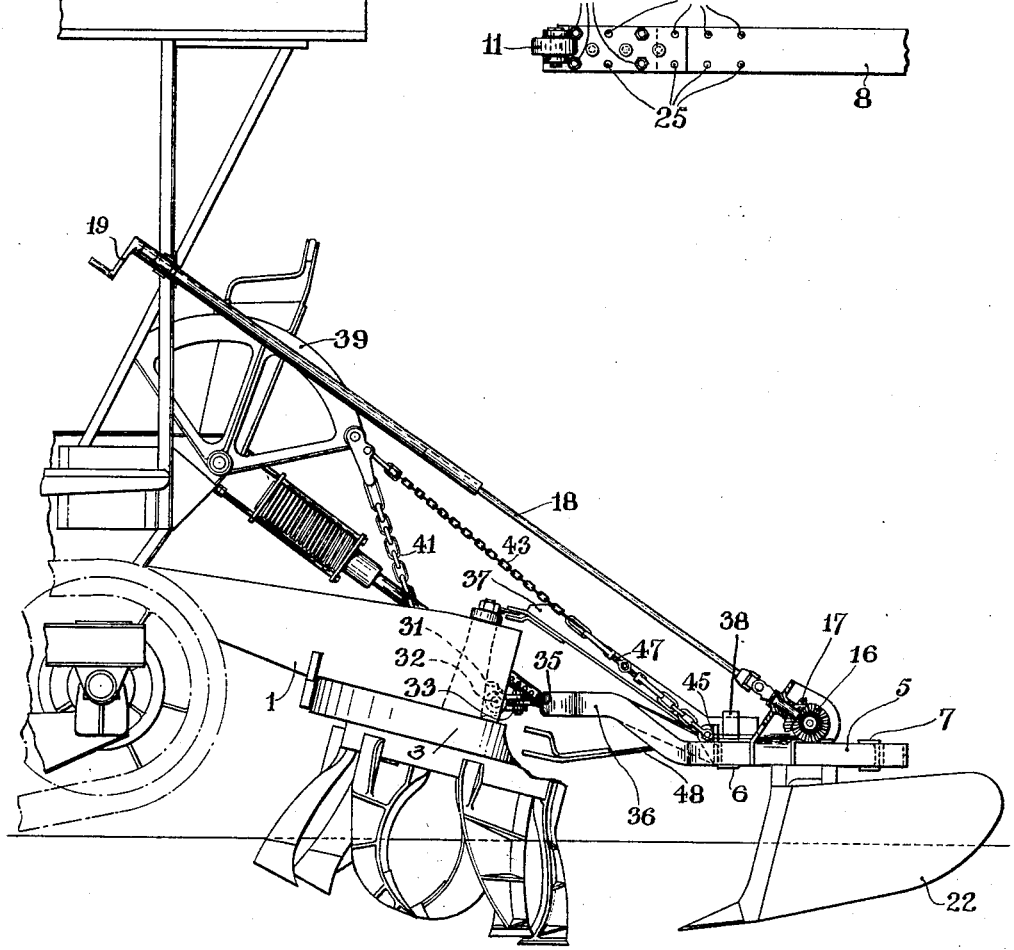
Fig. 1 is a diagrammatic side elevation showing so much of the tilling machine as is necessary for the explanation of the present improvement.
Figure 2:
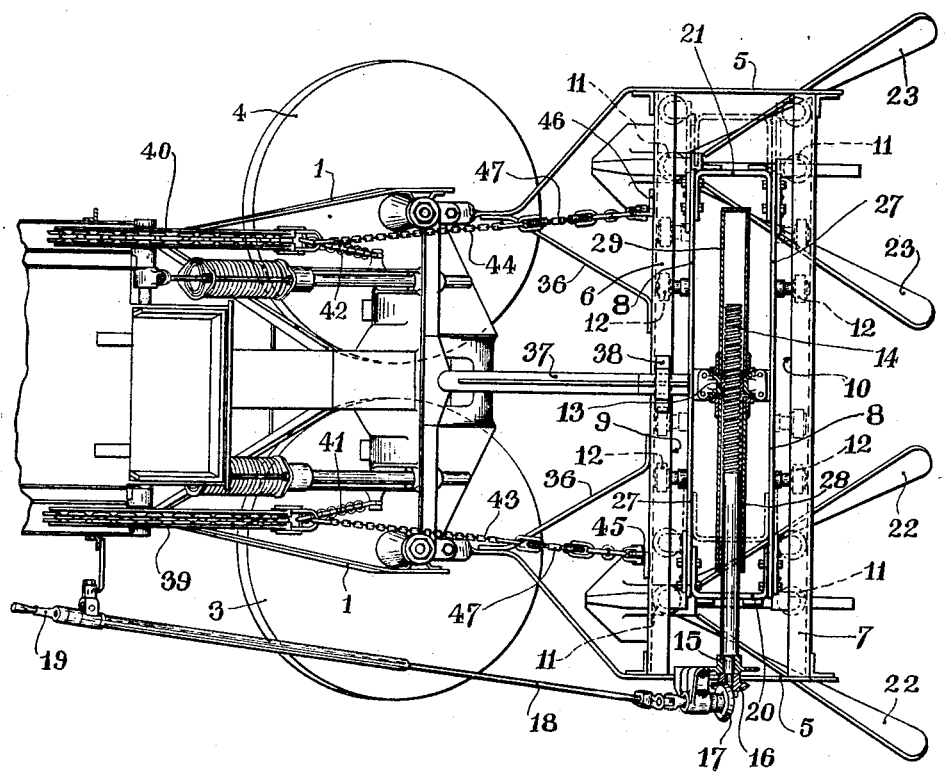
Fig. 2 is a plan view illustrating the improved method of mounting the ridgers, together with the means for moving them towards the right or left of the medial tilling line during the tilling.

Attachable to the trailing portion 1 of the tractor 2 which carries the rotatory diggers 3 and 4 is a rectangular frame 5, comprising transverse parallel channel or flanged members 6, 7 guiding a carriage or bogie 8 which is movable in the ways 9, 10 provided by said transverse members 6, 7, the carriage being preferably provided with horizontal and vertical rolls or wheels 11, 12 running on or against said ways. On said carriage is a threaded nut or socket 13 with which a screw threaded shaft 14 engages, the said shaft being mounted in a bearing 15 on the frame 5 and adapted to be actuated by bevelled gearing 16, 17 from a shaft 18 carried near to the driver's seat and there provided with a suitable handle 19 or the like for rotating it.

In the said carriage 8 at or near opposite ends thereof are sliding members 20, 21 movable longitudinally of the carriage and therefore transversely of the line of traction of the tilling machine, to which members 20, 21 the ridging implements 22, 23 are respectively connected. These members 20, 21 may be fixed in position on the carriage 8 as for example by bolts 24 passing through selected holes of a series of holes 25, in the members 26, 27 respectively of the carriage 8 and serve for the adjustment of the two ridging implements 22, 23 as regards their distance apart from one another.

By operation of the handle 19 within reach of the driver the ridging implements 22, 23 may be shifted together towards the one or the other side of the medial line of traction as may be required. For example, in travelling up the field, the ridging implements may be offset to the left, but on turning at the headlands the ridging implements may be off-set to the right of the machine.

The threaded portion of the screw threaded shaft 14 is protected from the soil by encasing tubes 28, 29.

The connecting shaft 18 between the handle 19 and bevel wheels 16, 17 is made telescopic to allow for change in length when the ridgers are lifted.

The method of attaching the frame 5 to the trailing portion 1 of the tractor is preferably as follows:—

The trailing portion 1 is provided with two lugs 30, 30 to which are connected two forks 31, 31 respectively by horizontal bolts 32, 32 about which the forks can swing in vertical planes. These forks are prolonged rearwardly in the form of forks or lugs 33 to which are secured by vertical bolts 34 the eyes 35 at the ends of two bracket frames 36, 36 respectively which are integral with the frame 5.

There is further attached to the trailing portion 1 a bar 37 which engages loosely in an eye 38 formed on the frame 5, and this bar may be supported also by a strut 48 suitably attached to the trailing portion 1.

In tillers of the character to which this invention is applied, the trailing portion carrying the rotatory tilling implements 3 is mounted so that it can be lifted clear of the ground when desired, as for example by two sectors 39, 40 and chains 41, 42 (one of which sectors and chains is shown in Fig. 1 the other being immediately behind it).

Further chains 43, 44 are attached to lugs 45, 46 on the front of the flanged member 6 and to the sectors 39, 40 respectively or to the chains 41, 42 near to the attachment of the latter to the said sectors. The chains 43, 44 are adjustable by draw links 47.

It will thus be obvious that when the tilling implements are lifted from the ground, the ridgers will also be raised.

What I claim as my invention and desire to secure by Letters Patent of the United States is:—

1. In a tilling machine comprising ridging implements adapted to be drawn through the loosened soil, the combination with the tilling machine frame, of a transverse frame attached to the tilling machine frame so as to be immovable laterally in respect thereof, ways in said frame, a carriage movable along said ways transversely of the line of tillage, ridgers attached to said carriage, and means extended to proximity of the driver's seat for traversing said carriage.

2. In a tilling machine comprising ridging implements adapted to be drawn through the loosened soil, the combination with the tilling machine frame, of a transverse frame attached to the tilling machine frame so as to be immovable laterally in respect thereof, ways in said frame, a carriage movable along said ways transversely of the line of tillage, the said carriage having its ends adjustable to and from each other, ridgers attached respectively to the adjustable ends of said carriage, and means extended to proximity of the driver's seat for traversing said carriage.

3. In a tilling machine comprising ridging implements adapted to be drawn through the loosened soil, the combination with the tilling machine frame, of a transverse frame attached to the tilling machine frame so as to be immovable laterally in respect thereof, ways in said frame, a carriage movable along said ways transversely of the line of tillage, ridgers attached to said carriage, a threaded nut on said carriage, a threaded transverse shaft engaging said nut and having bearing in said transverse frame, a further shaft, bevelled gear connecting said shafts and a handle on said further shaft and a seat for the driver in proximity to said handle.

4. In a tilling machine comprising ridging implements adapted to be drawn through the loosened soil, the combination with the tilling machine frame of a transverse frame attached to the tilling machine frame as to be immovable laterally in respect thereof, ways in said frame, a carriage movable along said ways transversely of the line of tillage, the said carriage having its ends adjustable to and from each other and ridgers attached respectively to the ends of said carriage.

5. In a tilling machine comprising ridging implements adapted to be drawn through the loosened soil, the combination with the tilling machine frame of a transverse frame attached to the tilling machine frame as to be immovable laterally in respect thereof, ways in said frame, a carriage movable along said ways transversely of the line of tillage, the said carriage having its ends adjustable to and from each other, ridgers attached respectively to the ends of said carriage, a threaded nut on said carriage, a threaded transverse shaft engaging said nut and having bearing in said transverse frame, a further shaft, bevelled gear connecting said shafts and a handle on said further shaft, and a seat for the driver in proximity to said handle.

6. In a tilling machine comprising ridging implements adapted to be drawn through the loosened soil, the combination with the tilling machine frame of a transverse frame attached to the tilling machine frame as to be immovable laterally in respect thereof, ways in said frame, a carriage movable along said ways transversely of the line of tillage, the said carriage having its ends adjustable to and from each other, ridgers attached respectively to the ends of said carriage, a threaded nut on said carriage, a threaded transverse shaft engaging said nut and having bearing in said transverse frame, a further shaft, bevelled gear connecting said shafts and a handle on said further shaft, a seat for the driver in proximity to said handle, and means for swinging the transverse frame in a direction to and from the soil.

CHARLES HENRY FOWLER.